(12) United States Patent
So et al.

(10) Patent No.: US 7,658,010 B2
(45) Date of Patent: Feb. 9, 2010

(54) COLLAPSIBLE CUTTER FOR BAKED GOODS

(75) Inventors: Kwok Kuen So, 2nd Floor, Chuan Yuan Factory Building, 342-344 Kwun Tong Road, Kwun Tong, Kowloon, Hong Kong SAR (CN); Yiu Chung Wan, Hong Kong (CN)

(73) Assignee: Kwok Kuen So, Hong Kong, SAR (CN)

( * ) Notice: Subject to any disclaimer, the term of this patent is extended or adjusted under 35 U.S.C. 154(b) by 269 days.

(21) Appl. No.: 11/780,688

(22) Filed: Jul. 20, 2007

(65) Prior Publication Data

US 2008/0086889 A1 Apr. 17, 2008

(30) Foreign Application Priority Data

Oct. 16, 2006 (EP) .................................. 06255324

(51) Int. Cl.
*A21C 15/04* (2006.01)
(52) U.S. Cl. .......................................... 30/114; 30/301
(58) Field of Classification Search .................... 30/114, 30/301, 302, 303, 315, 316, 289, 312, 320; 99/537–539, 542, 545
See application file for complete search history.

(56) References Cited

U.S. PATENT DOCUMENTS

| 1,706,934 | A | * | 3/1929 | Miles et al. | .................... 30/114 |
| 2,003,253 | A | * | 5/1935 | Deutsch | ........................ 30/114 |
| 2,240,908 | A | * | 5/1941 | Polk, Sr. et al. | ............... 99/538 |
| 6,557,260 | B1 | * | 5/2003 | Morris | ........................ 30/114 |
| 7,086,155 | B2 | * | 8/2006 | Chan et al. | .................... 30/114 |
| 7,480,999 | B2 | * | 1/2009 | Atwater et al. | ................ 30/302 |
| 2004/0020055 | A1 | * | 2/2004 | Zuker | ........................... 30/114 |
| 2008/0178470 | A1 | * | 7/2008 | Peterson | ....................... 30/114 |

* cited by examiner

*Primary Examiner*—Stephen Choi
(74) *Attorney, Agent, or Firm*—Leydig, Voit & Mayer, Ltd.

(57) ABSTRACT

A cutter includes radial cutting blades connected by a hinge about which the blades may be rotated between collapsed and extended positions. A rotary body and rotary cap form a handle which holds the inner ends of the blades. The members are mounted for rotation about the hinge axis relative to free blades. Circumferentially spaced stop faces on the body are spaced apart in the axial direction. Circumferentially spaced abutment faces on the cap are spaced apart in the radial direction. The abutment-engaging faces of adjacent free blades are correspondingly spaced apart in the radial direction. To extend the blades, the cap is rotated relative to the body, with the cap and body holding the portions of each free blade between a respective stop face and abutment face for locating the free blades in the extended positions.

10 Claims, 7 Drawing Sheets

US 7,658,010 B2

COLLAPSIBLE CUTTER FOR BAKED GOODS

TECHNICAL FIELD

The present invention relates to collapsible multi-blade cutters for cutting items, such as baked goods, into sectors.

BACKGROUND OF THE INVENTION

Multi-bladed kitchen cutters may be used to divide goods having a circular cross section into sectors for eating. These cutters ensure the even geometric shape of the sectors, and allow the goods to be cut in a single action. Such cutters are relatively large utensils, so it would be advantageous if they could be collapsed when packaged for sale and also when in storage.

U.S. Patent App. No. 2004/0020055 describes a pie cutter with radially-extending cutting blades connected by a hinge, allowing the blades to be rotated between collapsed and extended positions. Operation of this device however, requires grasping the blades to collapse or extend them. Moreover the members joining the radially outer ends of the blades are received between adjacent blades, restricting how closely the blades may be spaced in their collapsed positions. It is an object of the present invention to overcome or substantially ameliorate the above disadvantages or more generally to provide an improved collapsible cutter.

DISCLOSURE OF THE INVENTION

According to one aspect of the present invention there is provided a collapsible cutter comprising:
  a plurality of blades connected at their radially inner ends for relative rotation about a hinge axis between respective collapsed positions where the blades are generally abutting and extended positions where the radially outer ends are circumferentially spaced apart;
  first and second rotary members mounted for engagement with portions of the inner ends of the blades, the rotary members being mounted for rotation relative to one another about the hinge axis and relative to free blades of the blades;
  circumferentially spaced stop faces on one of the first and second rotary members, and
  circumferentially spaced abutment faces on the other of the first and second rotary members,
  whereby the first rotary member may be rotated relative to the second rotary member to hold the portions of each free blade between a respective stop face and abutment face for locating the free blades in their extended positions.

Preferably the stop faces and abutment faces are aligned substantially radially for engaging substantially radially aligned stop-engaging faces and abutment-engaging faces on the free blades respectively.

The stop faces are preferably spaced apart in the axial direction in a stepwise manner, the stop-engaging faces of adjacent free blades being correspondingly spaced apart in the axial direction in a stepwise manner.

The abutment faces are preferably spaced apart in the radial direction in a stepwise manner, the abutment-engaging faces of adjacent free blades being correspondingly spaced apart in the radial direction in a stepwise manner.

The blades may include at least one fixed blade fixed to one of the rotary members. Preferably the blades include a respective fixed blade fixed to both the first and second rotary members allowing the free blades to be held between the fixed blades in their collapsed positions. Preferably each blade includes at least one ring having a central aperture for receiving a hinge pin and at least one face for abutting a ring of an axially adjacent blade.

Preferably the cutter further includes a detent tending to prevent relative rotation between the first and second rotary members when the blades are in their extended positions.

Both the first and second rotary members preferably have outer surfaces by which they may be manually grasped, the rotary members together forming a handle assembly by which the cutter is held and operated. The first rotary member preferably has a cylindrical outer surface and the second rotary member has a domed outer surface. This invention thereby provides a cutter which is collapsible by manipulation of the handle assembly, thus avoiding the need for grasping the blades.

BRIEF DESCRIPTION OF THE DRAWINGS

Preferred forms of the present invention will now be described by way of example with reference to the accompanying drawings, in which:
FIG. 10b is a scrap section along lines BB of FIG. 10a;

DESCRIPTION OF THE PREFERRED EMBODIMENTS

Figure 1:
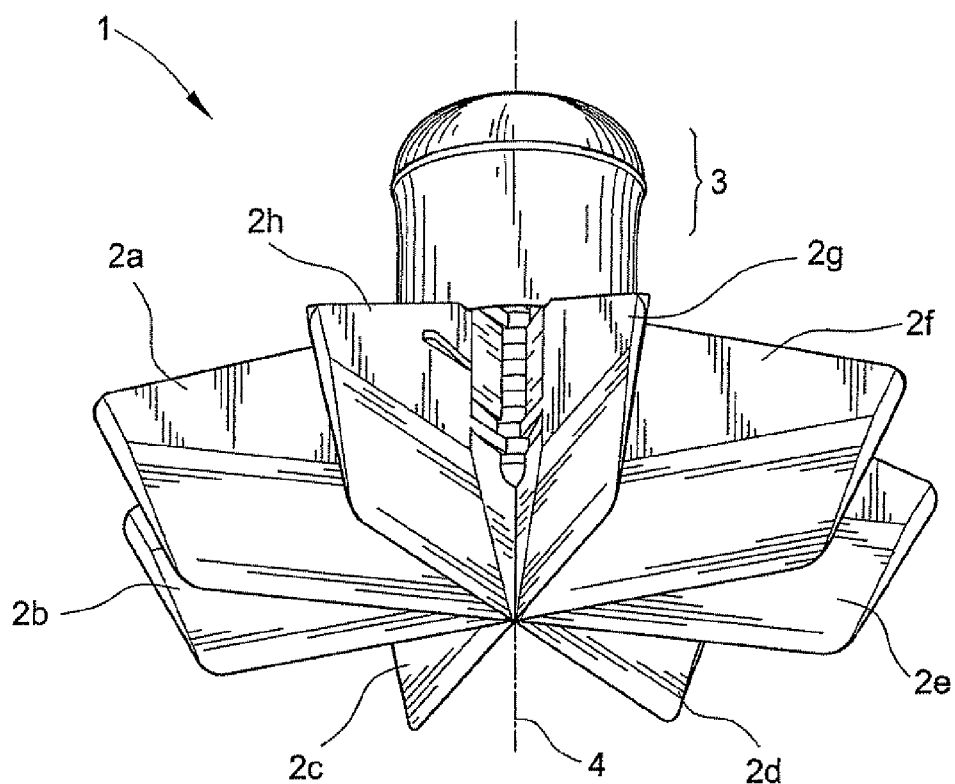
FIG. 1 is a pictorial view of an embodiment of the cutter of the invention in an extended configuration.
Figure 2:
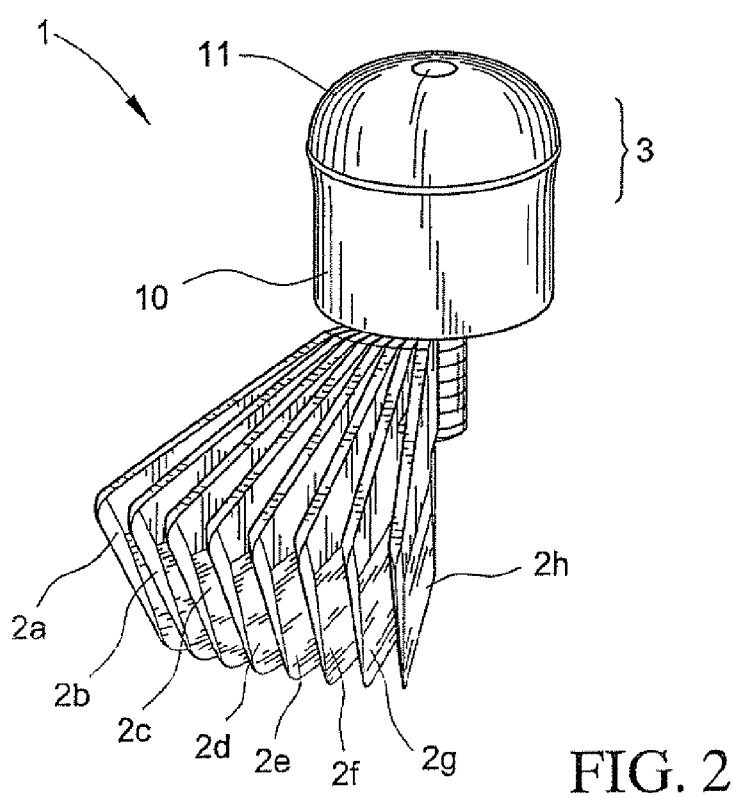
FIG. 2 is a pictorial view of the cutter of FIG. 1 in a collapsed configuration.

Referring to FIGS. 1 and 2, an embodiment of the collapsible cutter 1 includes eight blades 2a-2h extending radially from a handle assembly 3. The blades are connected at their radially inner ends for relative rotation about a hinge axis 4. In the extended configuration shown in FIG. 1 the radially outer ends of the blades 2a-2h are spaced apart equidistantly in the circumferential direction, the blades 2a-2h being angularly spaced at 45 degrees for producing eight segments. In the collapsed configuration shown in FIG. 2 the blades 2a-2h are abutting, the outermost blades 2a and 2h bounding a 45 degree circular segment. As used herein, the term "axial" refers to a direction substantially parallel to the hinge axis 4. The term "radial" refers to a direction substantially orthogonal to the hinge axis 4. The term "circumferential" refers to the direction of a circular arc having a radius substantially orthogonal to the hinge axis 4.

Figure 3:
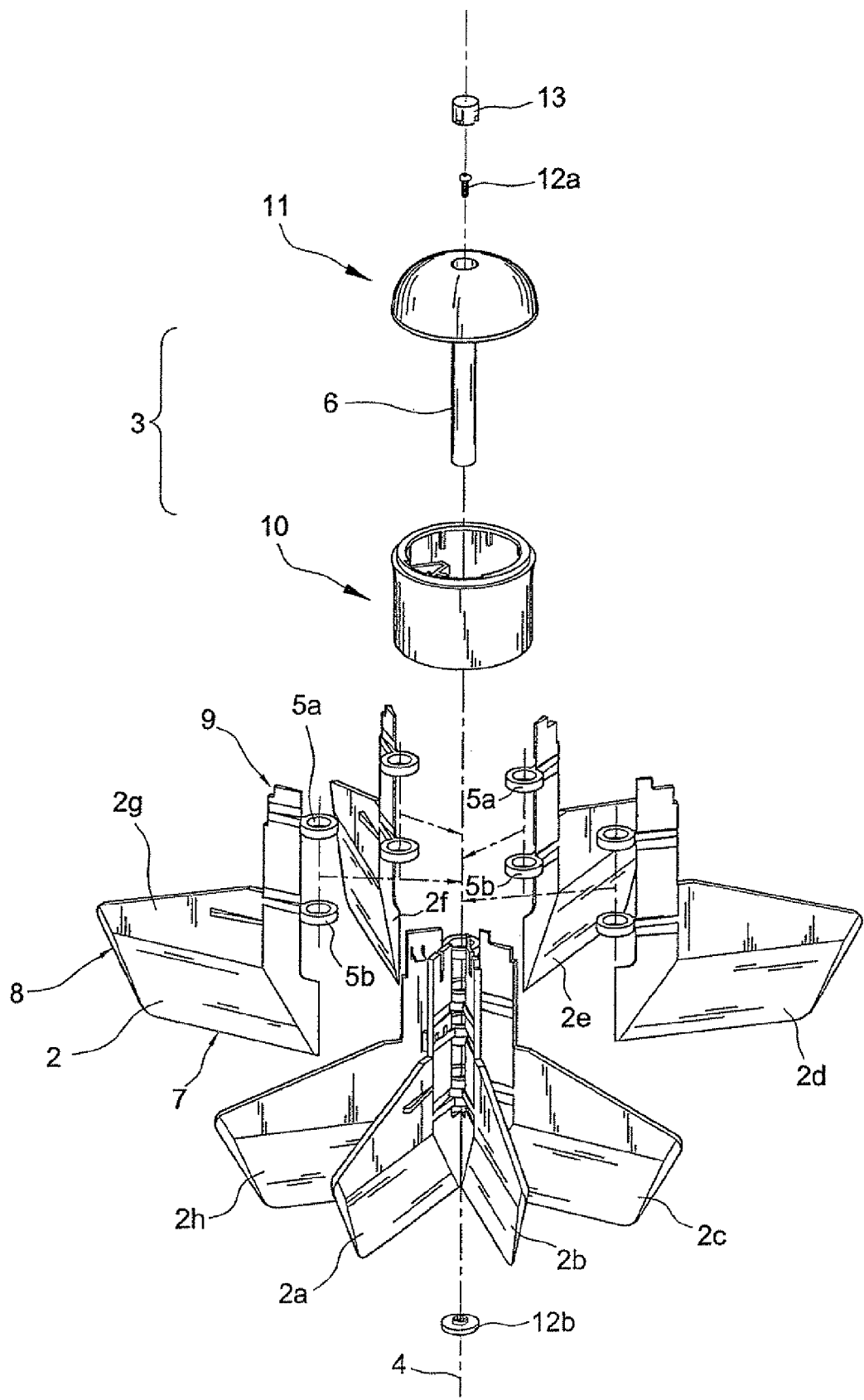
FIG. 3 is an exploded pictorial view of the cutter of FIG. 1.
Figure 4A:
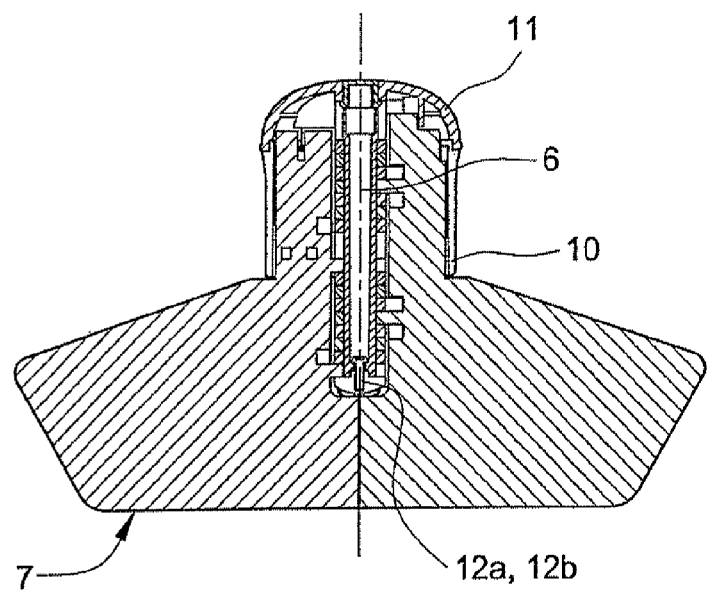
FIG. 4a is a longitudinal cross section of the cutter of FIG. 1.

As seen in FIGS. 3 and 4a, each of the blades 2a-2h includes a pair of coaxial rings 5a, 5b at its radially inner end, the rings 5*a*, 5*b* each having radially aligned annular faces for abutting a ring of an adjacent blade. The inner cutting edge portions 7 are straight, perpendicular to the hinge axis 4 and coplanar. The outer cutting edge portions 8 are obliquely inclined to the inner edges 7. Opposing the inner edge portions 7, the blades 2*a*-2*h* terminate in an upper end 9 which is received within the handle assembly 3. The handle assembly 3 includes a first rotary member or handle body 10 and a second rotary member or cap 11. The hinge pin 6 is fixed to or formed integrally with the dome-shaped cap 11 and extends centrally to connect the cap 11, body 10 and blades 2*a*-2*h*. Screw 12*a* is inserted through a longitudinal recess in the hinge pin 6 and the blades 2*a*-2*h* are connected by cooperating threaded fastener 12*b* at the lower end of the hinge pin 6, the axial recess in the cap 11 being closed by a plug 13.

Figure 4B:
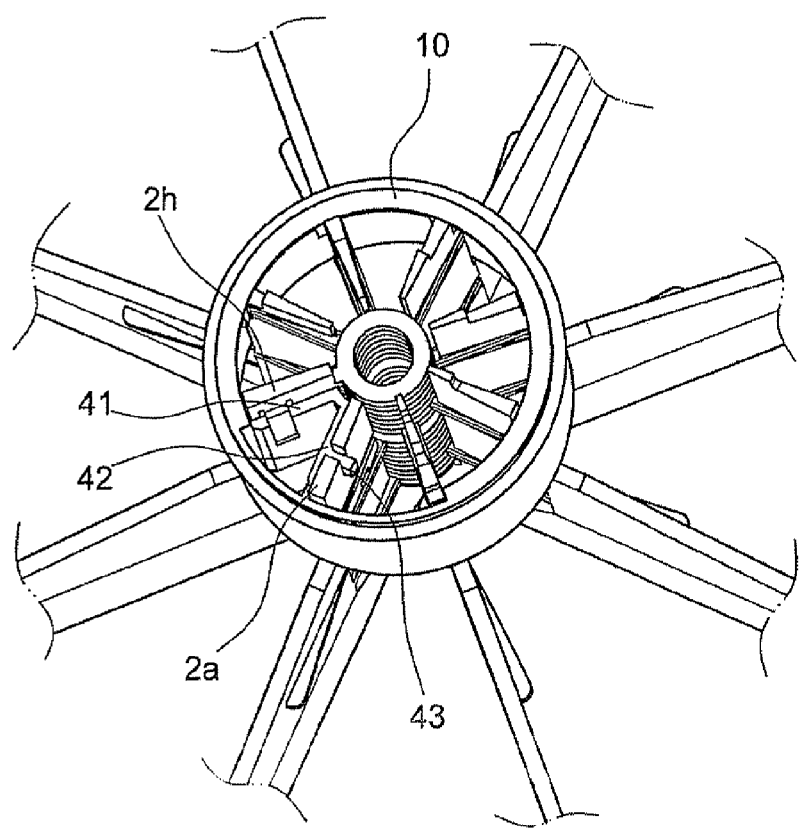
FIG. 4b is a pictorial view of the cutter of FIG. 1 with the cap removed.
Figure 5:
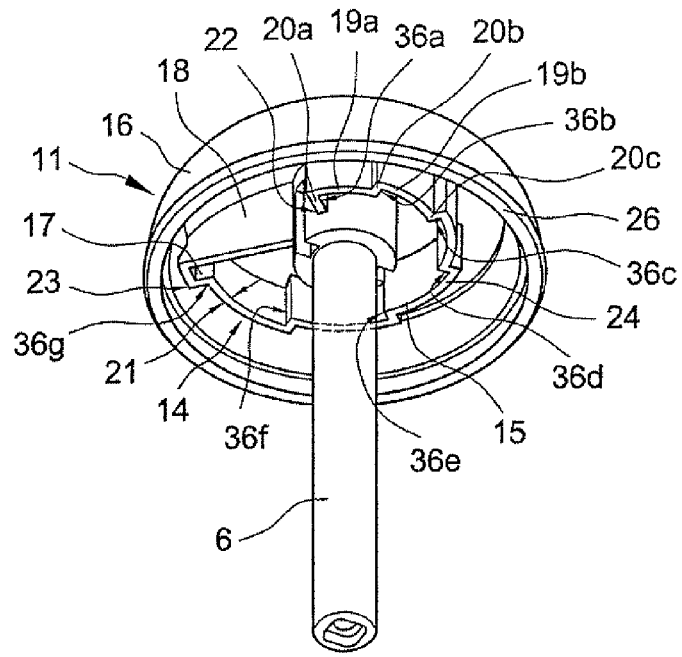
FIG. 5 is a pictorial view of the cap of the cutter of FIG. 1.

FIG. 4*b* shows two generally planar webs 41 and 42 formed in the body 10 and angularly separated by 45 degrees. The blade 2*a* is fixed to the web 42 by means of a clip 43 received in a slot in the outer end of the blade 2*a*. FIG. 5 illustrates an axially inwardly-extending fence 14 formed inside the cap 11 and having a substantially constant thickness 21 and a radially stepped spiral shape. An inner end 22 of the fence 14 joins to a boss 15 from which the hinge pin 6 extends. At an outer end 23 the fence 14 joins to the wall 16 of the cap 11. Adjacent the outer end 23, an axially-extending recess 17 is formed, bounded on one side by a radially aligned wall 18. The spiral shape of the fence 14 comprises circumferentially extending portions 20*a*-20*f* alternating with radially aligned step portions 19*a*-19*f* with radially aligned abutment faces 36*a*-36*f* spaced apart in the radial direction in a stepwise manner. The cap 11 has an inwardly facing annular face 26 for abutting the body 10.

Figure 6:
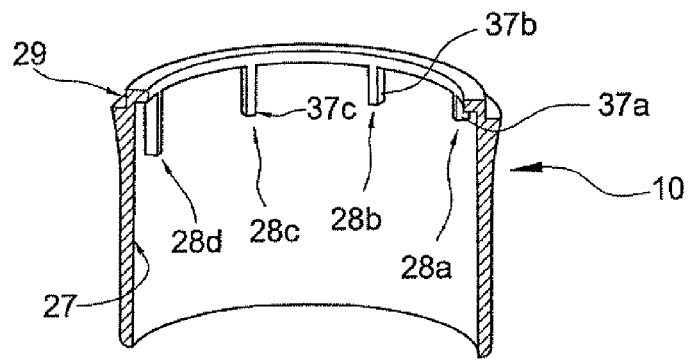
FIG. 6 is a pictorial view showing a longitudinal section through the body of the cutter of FIG. 1.

The body member 10, as seen in FIG. 6, has a generally cylindrical wall inner face 27. Circumferentially equidistantly spaced and projecting in from face 27 are six stops 28*a*-28*f* which are rectangular in transverse cross section. The stops 28*a*-28*h* extend axially inwardly from an outer rim 29, their lengths varying to provide respective stop faces 37*a*-37*f* spaced apart in the axial direction in a stepwise manner.

Figure 7:
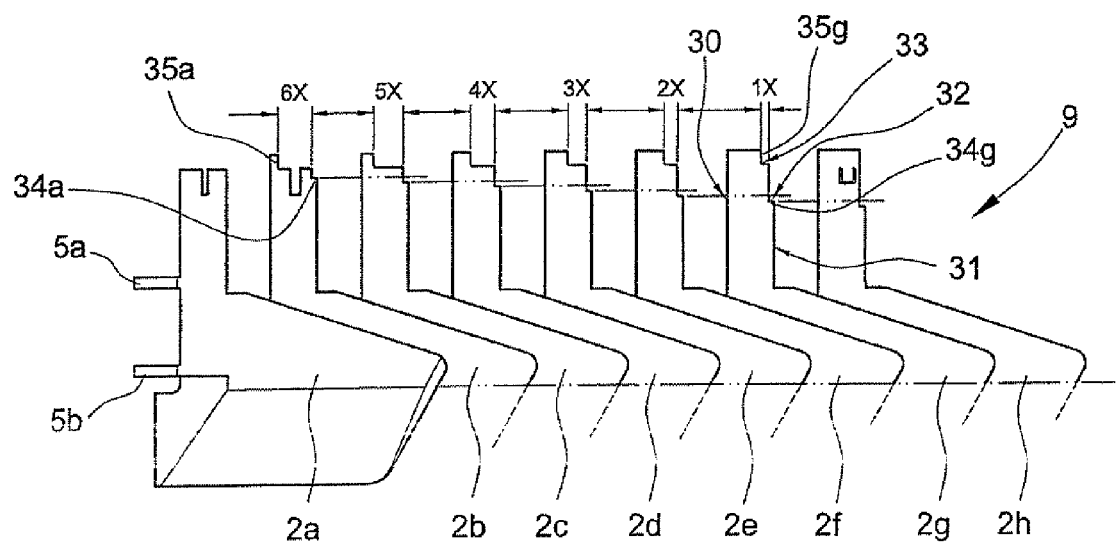
FIG. 7 is a side elevation of the upper end of each of the blades of the cutter of FIG. 1.

The stepwise variations in the shape of the upper ends 9 of the blades 2*a*-2*h* is illustrated in FIG. 7. The upper end 9 of each of the blades 2*a*-2*h* has radially inner and outer edges 30, 31 respectively. Blades 2*b*-2*h* have a first shoulder 32 in the radially outer edge 31 of a constant radial dimension. The axial position of the shoulder 32 varies between adjacent blades 2*b*-2*h*, moving axially inward in a stepwise manner between blade 2*b* and blade 2*h*. Stop-engaging faces 34 axially adjacent the first shoulder 32 are spaced apart in the axial direction in a stepwise manner by a distance corresponding to the spacing of the stop faces 37*a*-37*f*.

Blades 2*b*-2*g* have a second shoulder 33 in the radially outer edge 31. The second shoulder 33 has a constant axial dimension and a radial position that varies between blades 2*b*-2*g*, moving inward in a stepwise manner (by radial steps of dimension x) between blade 2*b* and blade 2*g*. Abutment-engaging faces 35*a*-35*g* radially adjacent the shoulder 33 are spaced apart in the radial direction in a stepwise manner by a distance corresponding to the spacing of the abutment faces 36*a*-36*f*.

Figure 8A:
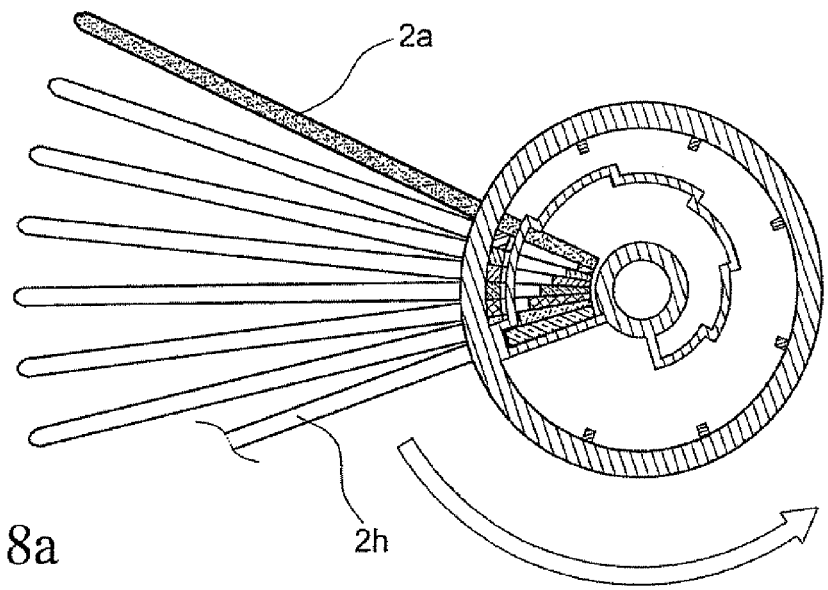
FIGS. 8a, 8b and 8c are schematic transverse sections through of the cutter of FIG. 1 illustrating consecutive steps in expanding the cutter blades.
Figure 8B:
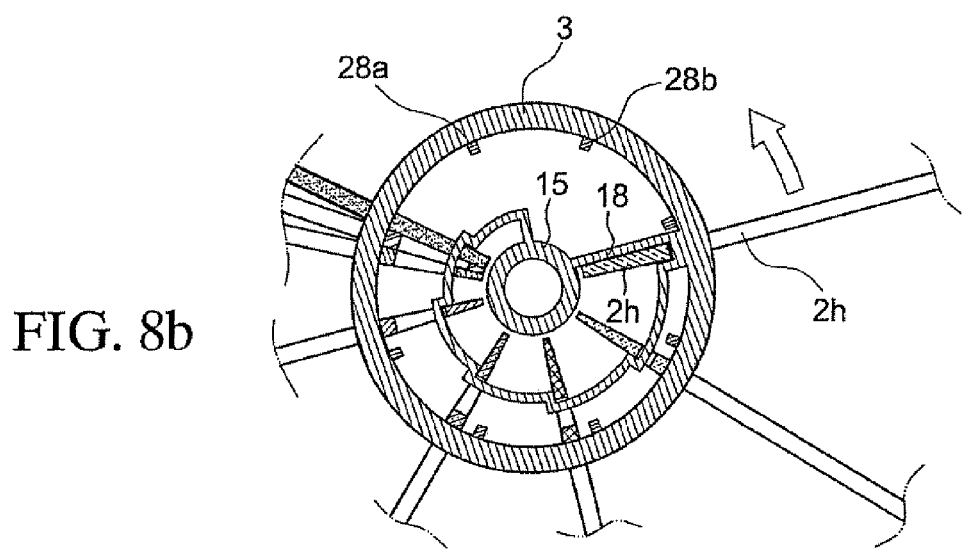
Figure 8C:
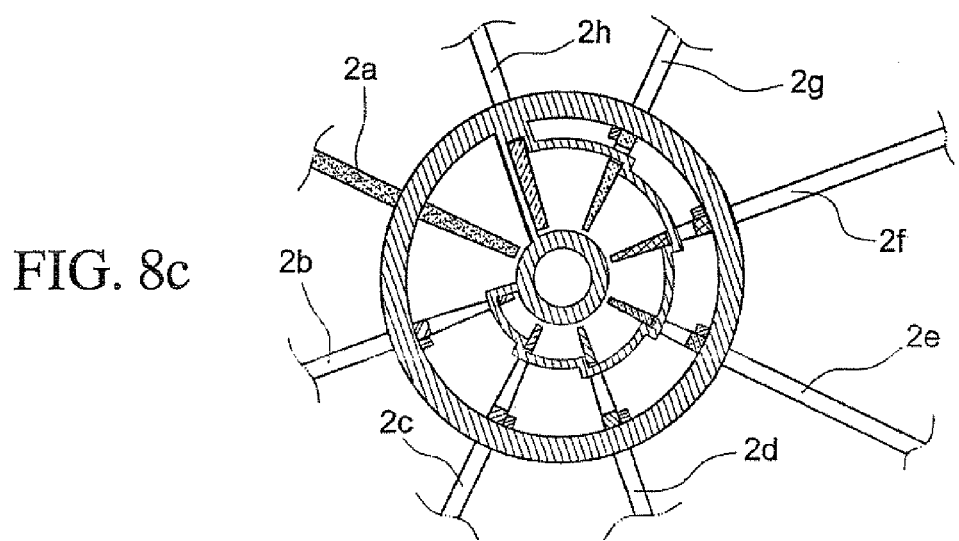
Figure 9A:
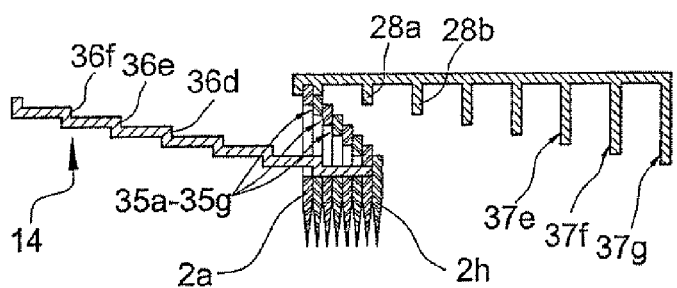
FIGS. 9a-9h are schematics illustrating consecutive steps in expanding the cutter blades.
Figure 9B:
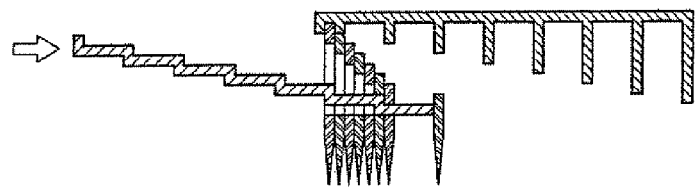
Figure 9C:
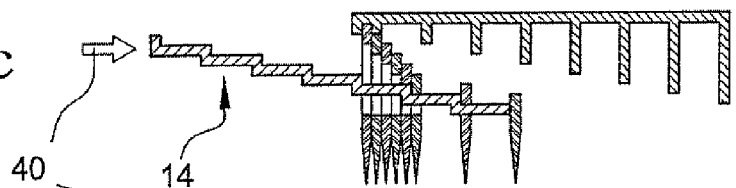
Figure 9D:
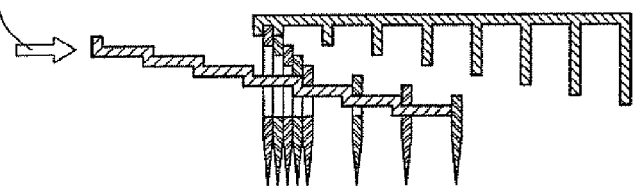
Figure 9E:
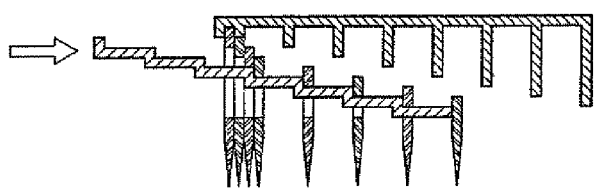
Figure 9F:
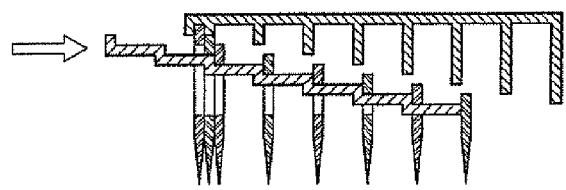
Figure 9G:
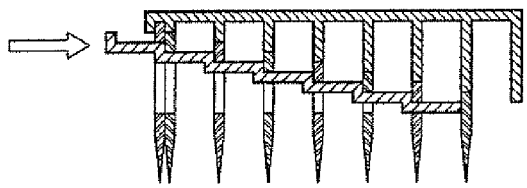
Figure 9H:
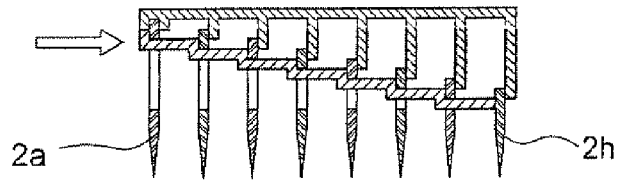

In FIGS. 8*a*-8*c*, the walls 41 and 42 (see FIG. 4*b*) fixed in the body 10 have been omitted for clarity and only the stops 28*a*-28*f* are shown. The upper end 9 of blade 2*h* is rotationally fixed to the cap 11, being received in the recess 17. The upper end 9 of blade 2*a* is rotationally fixed to the body 10, being received in a recess 60 in the body 10. The other blades 2*b*-2*g* are free to rotate relative to the body 10 and cap 11 (within certain limits as described below).

FIGS. 9*a*-9*h* schematically illustrate the fence 14 of the cap 11 and the stops 28*a*-28*f* of the body 10 in a manner analogous to a development of these parts, to show how movement (rotation) of the cap 11 relative to the body 10 moves the blades 2*a*-2*h* from their collapsed positions (FIG. 8*a*) to their extended positions (FIG. 8*f*). As the stepped fence 14 of the cap 11 is moved in direction 40 the abutment faces 36*a*-36*f* successively engage abutment-engaging faces 35*a*-35*g* of the blades 2*a*-2*h*. Movement of the fence 14 is limited when the stop-engaging faces 34 are simultaneously brought into contact with the stop faces 37*a*-37*f* of the stops 28*a*-28*h*, thereby locating the blades 2*a*-2*h* in their extended positions.

Figure 10A:
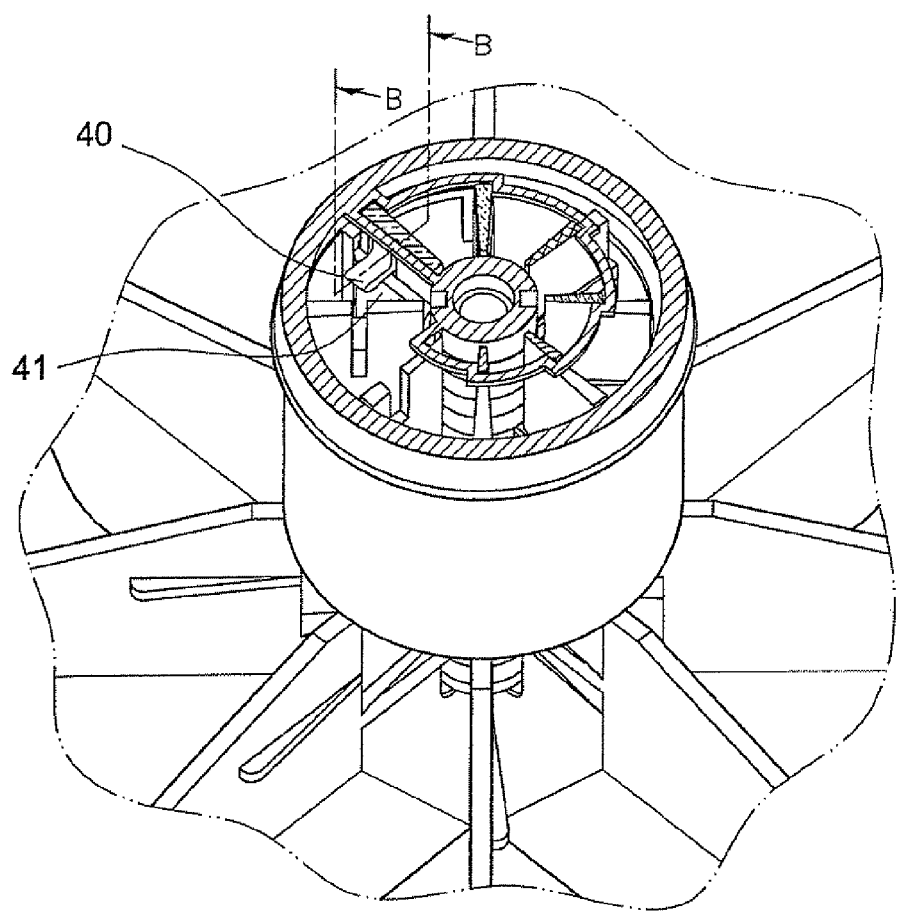
FIG. 10a is a pictorial view showing a transverse section through of the cutter of FIG. 1.
Figure 10B:
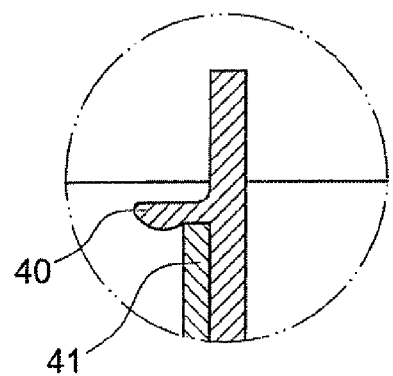

As seen in FIG. 10*a*, 10*b* a detent is provided for connecting the cap 11 and body 10 when the blades 2*a*-2*h* are in their extended positions. The detent includes a resilient hinge portion 40 formed on the blade 2*h* and projecting circumferentially from the face of the blade 2*h*. At the end of the angular movement, before the wall 18 abuts the web 41, the hinge 40 is deflected to ride over and clamp to the top of the web 41.

Aspects of the present invention have been described by way of example only and it should be appreciated that modifications and additions may be made thereto without departing from the scope thereof.

The invention claimed is:

1. A collapsible cutter comprising:
a plurality of blades connected at radially inner ends for relative rotation about a hinge axis, between respective collapsed positions, in which the blades are generally abutting, and respective extended positions, in which radially outer ends of the blades are circumferentially spaced apart;
first and second rotary members mounted for engagement with portions of the inner ends of the blades, the first and second rotary members being mounted for rotation relative to one another about the hinge axis and relative to free blades of the plurality of blades, the free blades being rotatable relative to at least one of the first and second rotary members;
circumferentially spaced stop faces on the first rotary member; and
circumferentially spaced abutment faces on the second rotary member, wherein, when the blades are in the respective collapsed positions and the first rotary member is rotated relative to the second rotary member, the second rotary member holds portions of each free blade, between respective stop and abutment faces of the second rotary member, and locates the free blades in the respective extended positions.

2. The cutter of claim 1, wherein the stop faces and the abutment faces are aligned substantially radially for engaging substantially radially aligned stop-engaging faces and abutment-engaging faces on the free blades, respectively.

3. The cutter of claim 1, wherein the stop faces are spaced apart in an axial direction in a stepwise manner, the stop-engaging faces of adjacent free blades being correspondingly spaced apart in the axial direction in a stepwise manner.

4. The cutter of claim 1, wherein the abutment faces are spaced apart in a radial direction in a stepwise manner, the abutment-engaging faces of adjacent free blades being correspondingly spaced apart in the radial direction in a stepwise manner.

5. The cutter of claim 1, wherein the plurality of blades includes at least one fixed blade fixed to one of the first and second rotary members.

6. The cutter of claim 1, wherein the plurality of blades includes fixed blades respectively fixed to each of the first and second rotary members, and the free blades are held between the fixed blades in the respective collapsed positions.

7. The cutter of claim 1, wherein each blade includes at least one ring having a central aperture for receiving a hinge pin and at least one face for abutting a ring of an axially adjacent blade.

8. The cutter of claim 1, wherein the cutter further includes a detent tending to prevent relative rotation between the first and second rotary members when the plurality of blades are in the respective extended positions.

9. The cutter of claim 1, wherein both the first and second rotary members have outer surfaces for manually grasping the first and second rotary members, and the first and second rotary members together form a handle assembly for holding and operating the cutter.

10. The cutter of claim 9, wherein the first rotary member has a cylindrical outer surface and the second rotary member has a domed outer surface.

* * * * *